United States Patent [19]

Fujitani et al.

[11] Patent Number: 5,041,270
[45] Date of Patent: Aug. 20, 1991

[54] METHOD OF PURIFYING EXHAUST GASES

[75] Inventors: Yoshiyasu Fujitani; Hideaki Muraki; Shiroh Kondoh; Masayuki Fukui, all of Aichi, Japan

[73] Assignee: Kabushiki Kaisha Toyota Chuo Kenkyusho, Aichi, Japan

[21] Appl. No.: 303,075

[22] Filed: Jan. 30, 1989

Related U.S. Application Data

[63] Continuation of Ser. No. 100,948, Sep. 25, 1987, abandoned.

[30] Foreign Application Priority Data

Oct. 17, 1986 [JP] Japan ............................... 61-247958

[51] Int. Cl.$^5$ ................................ B01D 53/36
[52] U.S. Cl. ................................ 423/213.2; 423/213.7
[58] Field of Search ................... 423/213.2, 213.7, 239, 423/351

[56] References Cited

U.S. PATENT DOCUMENTS

| | | | |
|---|---|---|---|
| 3,397,034 | 8/1968 | Tulleners et al. | 423/213.7 |
| 3,656,915 | 4/1972 | Tourtellotte | 423/213.7 |
| 3,860,535 | 1/1975 | Johnson | 423/213.7 |
| 3,976,745 | 8/1976 | Nakajima et al. | 423/351 |
| 4,003,976 | 1/1977 | Komatsu et al. | 423/213.7 |
| 4,018,710 | 4/1977 | Oshimura et al. | 423/351 |
| 4,071,600 | 1/1978 | Schlatter et al. | 423/213.7 |
| 4,389,382 | 6/1983 | Gandhi et al. | 423/213.7 |

FOREIGN PATENT DOCUMENTS

| | | | |
|---|---|---|---|
| 2165548 | 7/1973 | Fed. Rep. of Germany | 423/213.5 |
| 3642018 | 6/1987 | Fed. Rep. of Germany | 423/213.2 |

Primary Examiner—Jeffrey E. Russel
Attorney, Agent, or Firm—Oblon, Spivak, McClelland, Maier & Neustadt

[57] ABSTRACT

The exhaust gases, such as of an internal combustion engine are contacted with a catalyst containing copper in the presence of hydrocarbons in an oxidizing atmosphere, whereby nitrogen oxides are reduced from the exhaust gases. Then, the exhaust gases are preferably contacted with an oxidizing catalyst. The former catalyst contains copper loaded on a porous support formed from alumina, silica, silica-alumina or zeolite or mixture thereof. The support is preferably a monolithic body having a first portion loaded with copper and a second portion loaded with a metal or metals defining the oxidizing catalyst.

9 Claims, 1 Drawing Sheet

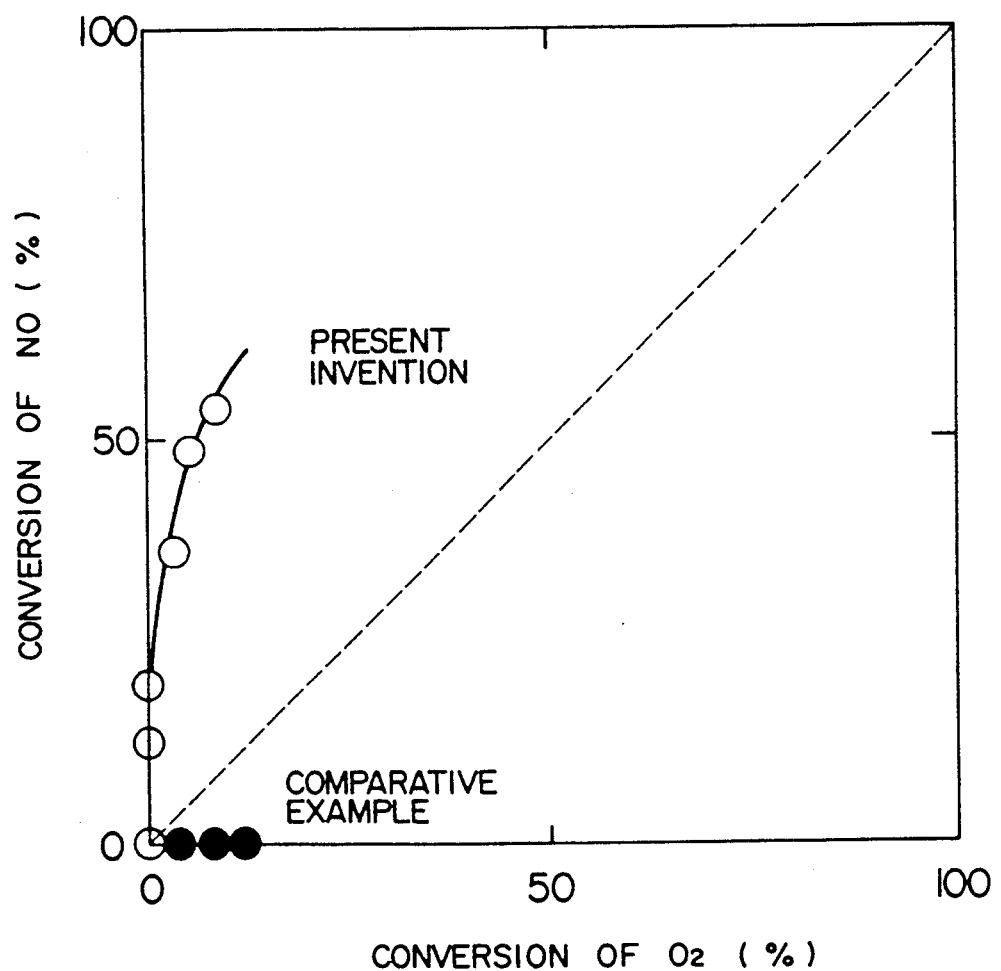

METHOD OF PURIFYING EXHAUST GASES

This application is a continuation-in-part of application Ser. No. 07/100,948, filed on Sept. 25, 1987, now abandoned.

BACKGROUND OF THE INVENTION

1. Field of the Invention

The present invention relates to a method of reducing nitrogen oxides efficiently from the exhaust gases of an internal combustion engine in an automobile, etc., a plant for producing nitric acid, or the like, and a catalyst used for carrying it out.

2. Description of the Prior Art

The exhaust gases of an internal combustion engine in an automobile, etc., a plant for producing nitric acid, or the like contains harmful components of nitrogen oxides ($NO_x$) which give rise to environmental pollution. Attempts have, therefore, been made in various fields of industry to reduce nitrogen oxides from such exhaust gases.

There is known a method which employs a catalyst for reducing nitrogen oxides form exhaust gases. According to this method, exhaust gases are brought into contact with a catalyst, whereby the nitrogen oxides contained therein are adsorbed on the surface of the catalyst and are decomposed to nitrogen and oxygen. The oxygen is then reacted with a reducing substance, such as carbon monoxide or hydrogen.

The catalyst which has hitherto been employed for reducing nitrogen oxides comprises a metal, such as copper, palladium, platinum or rhodium, loaded on a support formed from a porous material, such as alumina, zirconia or zeolite, as disclosed in e.g. Japanese Laid-Open Patent Specifications Nos. 11063/1976, 23474/1976 and 86693/1978.

The known method has, however, not been able to remove nitrogen oxides effectively in an oxidizing atmosphere which contains a greater amount of oxygen than is required for oxidizing a reducing substance (such as ammonia, carbon monoxide or hydrogen) completely to water ($H_2O$) or carbon dioxide ($CO_2$). This is because the oxygen which the atmosphere contains tends to react with the reducing substance more quickly than the oxygen which has been separated from the nitrogen oxides and prevents the latter from reacting with the reducing substance effectively. Such an oxidizing atmosphere is, for example, produced by an automobile engine if it is supplied with a fuel-air mixture having a higher ratio of air to the fuel and containing a greater amount of oxygen than is required for the complete combustion of any unburned fuel.

SUMMARY OF THE INVENTION

It is an object of the present invention to overcome the drawbacks of the prior art as hereinabove pointed out and provide a method which can purify exhaust gases by reducing nitrogen oxides therefrom effectively in an oxidizing atmosphere.

It is another object of the present invention to provide a catalyst which can effectively reduce nitrogen oxides from exhaust gases in an oxidizing atmosphere.

According to a first aspect of the present invention, there is provided a method of purifying exhaust gases containing nitrogen oxides which comprises contacting the exhaust gases with a catalyst containing copper in the presence of hydrocarbons in an oxidizing atmosphere to reduce the nitrogen oxides from the exhaust gas.

According to a second aspect of the present invention, the exhaust gases which have been contacted with the catalyst containing copper is further contacted with an oxidizing catalyst.

According to a third aspect of the present invention, there is provided a catalyst for purifying exhaust gases containing nitrogen oxides which comprises copper loaded on a support composed of a porous material, such as alumina, silica or zeolite.

The catalyst containing copper promotes the reaction between the nitrogen oxides and hydrocarbons and thereby enables the efficient reduction of the nitrogen oxides from the exhaust gases. The oxidizing catalyst reduces any unreacted carbon monoxide and hydrocarbons from the exhaust gases by oxidation.

The present invention is useful for purifying any exhaust gas containing nitrogen oxides, including the exhaust gases of an internal combustion engine in an automobile, various kinds of combustion facilities and a plant for producing nitric acid.

BRIEF DESCRIPTION OF THE DRAWING

The drawing is a graph showing the percentage conversions of NO and $O_2$ as obtained in EXAMPLE 1 which will hereinafter be described.

DETAILED DESCRIPTION OF THE INVENTION

The present invention is based on the discovery of the fact that in an oxidizing atmosphere, a catalyst containing copper promotes selectively the reaction between nitrogen oxides and hydrocarbons in exhaust gases.

The catalyst according to the present invention comprises copper loaded on a porous support. The porous support may be composed of one or more porous materials, such as alumina, silica, silica-alumina and zeolite. It may take various shapes, including granular and honey-combed.

The catalyst preferably contains 0.1 to 50 g of copper per liter of the porous support. If it contains only less than 0.1 g of copper, it cannot be expected to fulfill the purpose for which it is employed. It cannot be expected to produce any better result even if it may contain over 50 g of copper.

The porous support is preferably loaded with copper in a way which will now be described. A copper compound, such as copper nitrate or acetate, is dissolved in a solvent, such as water or alcohol. The porous support is immersed in its solution so that the solution may impregnate the support. Then, the support is dried and heated.

The reduction of nitrogen oxides from exhaust gases is carried out by contacting it with the catalyst in the presence of hydrocarbons when an oxidizing atmosphere prevails. The oxidizing atmosphere means an atmosphere containing a greater amount of oxygen than is required for oxidizing the existing reducing substances, i.e. the carbon monoxide, hydrogen and hydrocarbons which exhaust gases contains and the hydrocarbons which are added for carrying out the method of the present invention, to $H_2O$ and $CO_2$ completely. If the exhaust gases are, for example, of an internal combustion engine for an automobile, an oxidizing atmosphere is produced by a lean fuel-air mixture. When any such oxidizing atmosphere prevails, the catalyst containing copper promotes the reaction of hydrocarbons (HC) and nitrogen oxides ($NO_X$), which is shown by the following formula, rather than the reaction of hydrocarbons and oxygen, so that the nitrogen oxides may be effectively reduced:

$$\mu HC + vNO_X \rightarrow wH_2O + yCO_2 + zN_2$$

The hydrocarbons which the exhaust gases contain may be utilized as a reductant which is employed for the purpose of the present invention. The coercive addition of hydrocarbons should, however, be made if the exhaust gases do not contain any hydrocarbons, or if it contains only a smaller amount of hydrocarbons than is required for the reaction as shown by the formula above. The reaction is promoted still more effectively if some excess of hydrocarbons exist. Thus, the exhaust gases in which the reaction occurs preferably contains 100 to 5000 ppm of hydrocarbons in terms of $CH_4$.

The catalyst containing copper has a high activity for reducing nitrogen oxides, but a low activity for oxidizing the carbon monoxide, hydrocarbons, etc. which the exhaust gases contain. Therefore, the exhaust gases which have been contacted with the catalyst containing copper is preferably contacted with an oxidizing catalyst which can effectively reduce any such carbon monoxide, hydrocarbons, etc. The oxidizing catalyst may comprise one or more metals selected from among Pr, Pd, Rh, etc. The metal (or the metals) is preferably loaded on a porous support composed of alumina, silica, zirconia, etc. The catalyst preferably contains 0.1 to 10 g of the metal per liter of the porous support. If it contains only less than 0.1 g of the metal, it cannot be expected to fulfill the purpose for which it is employed. It cannot be expected to produce any better result even if it may contain over 10 g of the metal.

Referring more specifically to a method embodying the present invention, a catlaylst containing copper is placed in a reaction vessel and exhaust gases are introduced into the vessel so that they may be contacted with the catalyst. An oxidizing atmosphere is caused to prevail in the vessel, and an appropriate amount of hydrocarbons is supplied into the vessel if required. The purified gases are removed from the vessel.

Another method embodying the present invention employs both a catalyst containing copper and an oxidizing catalyst. A reaction vessel holding the catalyst containing copper is positioned upstream of a reaction vessel holding the oxidizing catalyst. The two catalysts may be formed by using a monolithic support in which an upstream portion is loaded with copper and a downstream portion is loaded with the metal or metals defining the oxidizing catalyst. This construction has the advantage that only a single support is required for realizing both the catalyst for reducing nitrogen oxides from exhaust gases and the catalyst for reducing hydrocarbons, carbon monoxide, etc.

The catalyst bed of the catalyst containing copper is preferably heated to a temperature of 300° C. to 600° C. to promote the desired reaction. The catalyst bed of the oxidizing catalyst is preferably heated to a temperature of 200° C. to 800° C. to promote the desired reaction.

The exhaust gases to be purified are preferably introduced into the catalyst bed of the catalyst containing copper at a space velocity (SV) of 10,000 to 100,000 $hr^{-1}$, and into the layer of the oxidizing catalyst at a space velocity of 10,000 to 100,000 $hr^{-1}$, too.

If the exhaust gases to be purified are of an internal combustion engine for an automobile, the catalyst containing copper, or the catalyst containing copper and the oxidizing catalyst, are preferably positioned downstream of an exhaust manifold. The invention is effective with an air fuel ratio of at least 18:1.

There is no particular limitation to the shape or structure of the catalyst containing copper or the oxidizing catalyst. They may be, for example, in form of granules, pellets, or a honeycombed body.

The invention will now be described more specifically with reference to several examples thereof. It is to be understood that the following examples are not intended to limit the scope of the present invention.

EXAMPLE 1

50 cc of Y-type zeolite (product of Union Carbide) were dipped in 100 cc of an aqueous solution containing 0.5 mol of copper nitrate per liter and having a temperature of 80° C. and after 24 hours, the zeolite was removed from the solution and washed by water. This procedure was repeated five times. Then, the zeolite was dried at 110° C. for 12 hours and calcined at 600° C. for three hours in the air to yield a catalyst containing copper and embodying the present invention (Sample No. 1). The catalyst contained 2% by weight of copper.

For the sake of comparison, a catalyst containing palladium (Comparative Sample No. C1) was prepared by repeating substantially the foregoing procedure, but employing an acidic aqueous solution of palladium nitrate instead of the copper nitrate solution. This catalyst contained 0.2% by weight of palladium.

The two catalysts were each examined for selectivity between the reaction of HC and $NO_X$ and the reaction of HC and $O_2$. A fixed catalyst bed was formed from 7 cc of each catalyst in a quartz reactor having an inside diameter of 18 mm. The catalyst bed was heated to 400° C. and a gas containing 1000 ppm of NO and 2% of $O_2$, the balance being $N_2$, was introduced into the reactor at a space velocity (SV) of 30,000 $hr^{-1}$. At the same time, propylene was also introduced into the reactor in a quantity stepwisely increasing up to 1800 ppm in terms of $CH_4$, or THC (total hydrocarbon). The resulting conversions of each of NO and $O_2$ were measured. The results are shown in the drawing. The ordinate represents the conversion of NO and the abscissa represents the conversion of $O_2$ and the increasing quantity of propylene. The diagonal line which appears in the drawing defines a 50% selectivity between the reaction of HC and $NO_X$ and the reaction of HC and $O_2$.

The curve obtained by plotting the results of the reaction which was promoted by the catalyst embodying the present invention (Sample No. 1) lies at a very high region above the diagonal line. It is, therefore, obvious that the catalyst of the present invention has a high selectivity for the reaction of HC and $NO_X$. On the other hand, the curve obtained by plotting the results of the use of the comparative catalyst (sample No. C1) lies on the abscissa showing the conversion of $O_2$. This means that the comparative catalyst hardly promoted the reaction of HC and $NO_X$.

EXAMPLE 2

Four samples of catalyst embodying the present invention (Samples Nos. 2 to 5) were prepared by impregnating four different types of porous supports, respectively, with an aqueous solution of copper nitrate, as shown in the table which will hereinafter appear. Four comparative samples of catalyst (Samples Nos. C2 to C5) containing four different metals, respectively, were also prepared.

Each sample was tested for its effectiveness in the conversion of NO. The reaction was carried out by employing the same apparatus and conditions as those used in EXAMPLE 1 and introducing into the catalyst bed a gas containing 1000 ppm of NO, 0.3% of CO, 1300 ppm of propylene in terms of $CH_4$, 2.1% of $O_2$, 12% of $CO_2$ and 3% of $H_2O$, the balance being $N_2$. The results are shown in the table. As is obvious therefrom, all of the samples of the present invention showed a higher conversion of NO than any of the comparative samples.

TABLE

| Sample No. | Catalyst Metal | Catalyst Support | Amount of metal (wt. %) | Conversion of NO (%) | |
|---|---|---|---|---|---|
| 2 | Cu | γ-alumina | 5 | 15 | |
| 3 | Cu | Silica | 5 | 20 | Invention |
| 4 | Cu | Silica-alumina | 5 | 10 | |
| 5 | Cu | L-type zeolite | 5 | 25 | |
| C2 | Co | γ-alumina | 5 | 0 | |
| C3 | Mn | " | 5 | 0 | Comparative |
| C4 | Pt | " | 5 | 0 | |
| C5 | Rh | " | 5 | 0 | |

EXAMPLE 3

Each of Samples Nos. 1 and C1, which had been prepared in EXAMPLE 1, was tested for its conversion of $NO_X$ in the exhasut gas of a practical engine. A catalytic converter having a volume of 1.9 liters was filled with each sample of catalyst (Sample No. 1). A 2000 cc engine was operated at a rotating speed of 1600 rpm and a manifold pressure of −400 mmHg, while it was supplied with a lean fuel-air mixture having an air to fuel ratio of 18:1. The exhaust gas of the engine entering the catalytic converter had a temperature of 400° C. and contained 1500 ppm of $NO_X$. Sample No. 1 showed a $NO_X$ conversion of 40%, while Comparative Sample No. C1 could not reduce $NO_X$ at all (i.e. it showed a conversion of 0%).

These results confirm that the present invention can effectively remove $NO_X$ in an oxidizing atmosphere.

EXAMPLE 4

A combination of each of Samples Nos. 1 and C1 with an oxidizing catalyst was tested for its conversion of $NO_X$, CO and THC in the exhaust gas of a practical engine. A catalytic converter having a volume of 1.9 liters was filled with each sample and positioned downstream of the exhaust manifold of the engine. A catalytic converter also having a volume of 1.9 liters was filled with the oxidizing catalyst and positioned downstream of the converter holding Sample No. 1 or C1. The engine having a volume of 2000 cc was driven at a rotating speed of 2000 rpm and a manifold pressure of −350 mmHg. It was supplied with a lean fuel-air mixture having an air to fuel ratio of 18:1. The exhaust gas entering the catalytic converter had a temperature of 500° C., a $NO_X$ content of 2000 ppm, a CO content of 0.2% and a THC content of 1500 ppm. The combination of Sample No. 1 and the oxidizing catalyst showed a $NO_X$ conversion of 45%, a CO conversion of 99% and a HC conversion of 98%. The combination of Comparative Sample No. C1 and the oxidizing catalyst did, however, not reduce $NO_X$ at all, though it was as effective for the conversion of CO and HC as the combination including Sample No. 1.

These results confirm that the present invention can effectively reduce $NO_X$ in an oxidizing atmosphere.

EXAMPLE 5

A catalyst was formed by loading copper and palladium (as an oxidizing catalyst) on upstream and downstream portions of a monolithic support, respectively and tested for its conversions of $NO_X$, CO and HC. The monolithic support (400 mesh) was a product of Nippon Gaishi formed from cordierite (30 mm in diameter, 50 mm in length and about 15 g). It had an upperstream portion and a downstream portion each having a length of about 25 mm. The upperstream portion was coated with about 2.5 g of slurry which had been prepared by mixing 80 parts of Y-type zeolite (SK-40 of Union Carbide) and 20 parts of an alumina sol (AS200 of Nissan Chemical), and was calcined at 500° C. The downstream portion was coated with about 3 g of a slurry which had been prepared by mixing 80 parts of a powder of γ-alumina (which had been obtained by crushing KHA-24 of Sumitomo Chemical) and 20 parts of the same alumina sol as hereinabove mentioned.

The upperstream portion of the support was loaded with copper by employing the method which had been employed for the preparation of Sample No. 1 in EXAMPLE 1. The downstream portion was loaded with palladium by employing the method which had been employed for the preparation of Comparative Sample No. C1 in EXAMPLE 1. The resulting catalyst contained 0.24% by weight of copper and 0.03% by weight of palladium.

The catalyst was heated to 500° C. and a gas containing 1000 ppm of NO, 0.3% of CO, 1300 ppm of propylene in terms of $CH_4$, 2.5% of $O_2$, 10% of $CO_2$ and 10% of $H_2O$, the balance being $N_2$, was supplied to the catalyst at a flow rate of 50 liters per minute so that it might flow first through its upperstream portion and then through its downstream portion. The purified gas leaving the catalyst showed a NO conversion of 30%, a CO conversion of 98% and a propylene conversion of 99%.

For the sake of comparison, the downstream portion of the catalyst was cut away from its upperstream portion and was likewise tested. It could not reduce NO at all, though it achieved a CO conversion of 95% and a propylene conversion of 96%.

These results confirm that the present invention can effectively remove NO in an oxidizing atmosphere.

What is claimed is:

1. A method of purifying exhaust gases from an automobile engine supplied with a lean fuel-air mixture having an air-fuel ratio of at least 18:1 and having a higher ratio of air to the fuel and containing a greater amount of oxygen than is required for the complete combustion of any unburned fuel, said exhaust gases containing nitrogen oxides in an oxygen containing oxidizing atmosphere containing also hydrocarbons and CO, comprising the catalytic step of contacting the exhaust gases with a catalyst containing copper in the presence of hydrocarbons in an amount sufficient to satisfy the stoichiometric requirement for converting the nitrogen oxides to $N_2$ in the oxidizing atmosphere, thereby reducing the nitrogen oxides from the exhaust gases to $N_2$, while retaining residual hydrocarbons and CO, the oxiding atmosphere being one produced solely by the lean fuel air mixture and in which oxidizing atmosphere the amount of oxygen present in the exhaust gases as they are produced is greater than that required for oxidizing the existing reducing substances to $H_2O$ and $CO_2$, wherein said copper is loaded on a porous support, and, wherein said porous support is formed from zeolite.

2. A method of purifying exhaust gases from an automobile engine supplied with a lean fuel-air mixture having an air-fuel ratio of at least 18:1 and having a higher ratio of air to the fuel and containing a greater amount of oxygen than is required for the complete combustion of any unburned fuel, said exhaust gases containing nitrogen oxides in an oxygen containing oxidizing atmosphere containing also hydrocarbons and CO, comprising the catalytic step of contacting the exhaust gases with a catalyst containing copper in the presence of hydrocarbons in an amount sufficient to satisfy the stoichiometric requirement for converting the nitrogen oxides to $N_2$ in the oxidizing atmosphere, thereby reducing the nitrogen oxides from the exhaust gases to $N_2$, while retaining residual hydrocarbons and CO, the oxidizing atmosphere being one produced solely by the lean fuel air mixture and in which oxidizing atmosphere the amount of oxygen present in the exhaust gases as they are produced is greater than that required for oxidizing the existing reducing substances to $H_2O$ and $CO_2$, wherein said copper is loaded on a porous support formed from at least one material selected from the group consisting of alumina, silica, silica-alumina and zeolite, wherein said copper has a weight of 0.1 to 50 g per liter of said porous support, and, wherein said porous support comprises a monolithic body having a first portion loaded with said copper and a second portion loaded with an oxidizing catalyst for reducing substances from the exhaust gases leaving said first portion.

3. A method as set forth in claim 2, wherein said oxidizing catalyst comprises at least one metal selected from the group consisting of platinum, palladium and rhodium and has a weight of 0.1 to 10 g per liter of said porous support.

4. A method of purifying exhaust gases from an automobile engine supplied with a lean fuel-air mixture having an air-face ratio of at least 18:1 and having a higher ratio of air to fuel and containing a greater amount of oxygen than is required for the complete combustion of any unburned fuel, said exhaust gases characterized by possessing an oxidizing atmosphere and containing nitrogen oxides but not containing a sufficient amount of reducing compounds capable of reducing nitrogen oxides to $N_2$, comprising adding hydrocarbons to the exhaust gases in amount stoichiometrically sufficient to reduce the nitrogen oxides to N and thereafter contacting the exhaust gases with copper containing catalyst in the presence of hydrocarbons in an oxidizing atmosphere at a temperature of 300° to 600° C., thereby reducing the quantity of the nitrogen oxides in the exhaust gases, the oxidizing atmosphere being one produced solely by the lean fuel-air mixture and the added hydrocarbon and being an atmosphere containing a greater amount of oxygen than is required for oxidizing the reducing compounds including the added hydrocarbons, to $H_2O$ and $CO_2$, the amount of oxygen present being solely that of the exhaust gases as they are produced.

5. A method of purifying exhaust gases from an automobile engine supplied with a lean fuel-air mixture having a higher ratio of air to the fuel and containing a greater amount of oxygen than is required for the complete combustion of any unburned fuel, said exhaust gases containing nitrogen oxides in an oxygen containing oxidizing atmosphere containing also hydrocarbons and CO, comprising the catalytic step of contacting the exhaust gases with a catalyst containing copper in the presence of hydrocarbons in an amount sufficient to satisfy the stoichiometric requirement for converting the nitrogen oxides to $N_2$ in the oxidizing atmosphere, thereby reducing the nitrogen oxides from the exhaust gases to $N_2$, while retaining residual hydrocarbons and CO, the oxidizing atmosphere being one produced solely by the lean fuel air mixture and in which oxidizing atmosphere the amount of oxygen present in the exhaust gases as they are produced is greater than that required for oxidizing the existing reducing substances to $H_2O$ and $CO_2$, wherein said copper is loaded on a porous support formed from zeolite, and wherein said copper has a weight of 0.1 to 50 g per liter of said porous support.

6. A method of purifying exhaust gases from an automobile engine supplied with a lean fuel-air mixture having a higher ratio of air to the fuel and containing a greater amount of oxygen that is required for the complete combustion of any unburned fuel, said exhaust gases containing nitrogen oxides in an oxygen containing oxidizing atmosphere containing also hydrocarbons and CO, comprising the catalytic step of contacting the exhaust gases with a catalyst containing copper in the presence of hydrocarbons in an amount sufficient to satisfy the stoichiometric requirement for converting the nitrogen oxides to $N_2$ in the oxidizing atmosphere, thereby reducing the nitrogen oxides from the exhaust gases to $N_2$, while retaining residual hydrocarbons and CO, the oxidizing atmosphere being one produced solely by the lean fuel air mixture and in which oxidizing atmosphere the amount of oxygen present in the exhaust gases as they are produced is greater than that required for oxidizing the existing reducing substances to $H_2O$ and $CO_2$, wherein said copper is loaded on a porous support formed from at least one material selected from the group consisting of alumina, silica, silica-alumina and zeolite and wherein said copper has a weight of 0.1 to 50 g per liter of said porous support, and further wherein said porous support comprises a monolithic body having a first portion loaded with said copper and a second portion loaded with an oxidizing catalyst for reducing substances from the exhaust gases leaving said first portion.

7. A method as set forth in claim 6, wherein said oxidizing catalyst comprises at least one metal selected from the group consisting of platinum, palladium and rhodium and has a weight of 0.1 to 10 g per liter of said porous support.

8. A method as set forth in claim 1, wherein said catalyst containing copper is heated to a temperature of 300° C. to 600° C., while said oxidizing catalyst is heated to a temperature of 200° C. to 800° C.

9. A method as set forth in claim 8, wherein said exhaust gases are contacted with each of said catalysts at a space velocity of 10,000 to 100,000 $hr^{-1}$.

* * * * *